United States Patent
Mascaro et al.

(10) Patent No.: US 10,176,534 B1
(45) Date of Patent: Jan. 8, 2019

(54) METHOD AND SYSTEM FOR PROVIDING AN ANALYTICS MODEL ARCHITECTURE TO REDUCE ABANDONMENT OF TAX RETURN PREPARATION SESSIONS BY POTENTIAL CUSTOMERS

(71) Applicant: Intuit Inc., Mountain View, CA (US)

(72) Inventors: Massimo Mascaro, San Diego, CA (US); Yao H. Morin, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 450 days.

(21) Appl. No.: 14/691,145

(22) Filed: Apr. 20, 2015

(51) Int. Cl.
G06Q 40/00 (2012.01)

(52) U.S. Cl.
CPC .............................. G06Q 40/123 (2013.12)

(58) Field of Classification Search
CPC .................................................... G06Q 40/123
See application file for complete search history.

(56) References Cited

U.S. PATENT DOCUMENTS

| | | | |
|---|---|---|---|
| 5,884,283 | A | 3/1999 | Manos |
| 6,021,397 | A | 2/2000 | Jones et al. |
| 6,401,080 | B1 | 6/2002 | Bigus et al. |
| 6,871,322 | B2 | 3/2005 | Gusler et al. |
| 7,010,507 | B1 | 3/2006 | Anderson et al. |
| 7,181,438 | B1 | 2/2007 | Szabo |
| 7,240,297 | B1 | 7/2007 | Anderson et al. |
| 7,539,635 | B1 | 5/2009 | Peak et al. |
| 7,590,572 | B2 | 9/2009 | Larson |
| 7,603,301 | B1 | 10/2009 | Regan |
| 7,610,226 | B1 | 10/2009 | Miller |
| 7,636,742 | B1 | 12/2009 | Olavarrieta et al. |

(Continued)

FOREIGN PATENT DOCUMENTS

| | | |
|---|---|---|
| JP | 2002-099613 | 4/2002 |
| KR | 10-2009-0089225 | 8/2009 |

OTHER PUBLICATIONS

Zhang, Zhenya, et al.; "Enabling Personalization Recommendation with WeightedFP for Text Information Retrieval Based on User-Focus," Proceedings of the International Conference on Information Technology: Coding and Computing (ITCC'04), 5 pp.

(Continued)

*Primary Examiner* — Scott S Trotter
(74) *Attorney, Agent, or Firm* — Hawley Troxell Ennis & Hawley LLP; Philip McKay (57) ABSTRACT

A method and system improve retention of a user of a tax return preparation system by personalizing a tax return preparation interview with questions that are at least partially based on user data processed by one or more predictive models, according to one embodiment. The method and system include receiving user data that is associated with a user, and applying the user data to one or more predictive models to cause the one or more predictive models to generate predictive output data, according to one embodiment. The predictive output data are scores for a subset of questions, and scores represent a relevance to the user of each of the subset of questions, according to one embodiment. The method and system include presenting selected ones of the subset of questions to the user, at least partially based on the scores, to personalize a tax return preparation interview for the user.

14 Claims, 3 Drawing Sheets

(56) References Cited

U.S. PATENT DOCUMENTS

| | | |
|---|---|---|
| 7,680,756 B2 | 3/2010 | Quinn et al. |
| 7,685,034 B1 | 3/2010 | Mori et al. |
| 7,693,769 B1 | 4/2010 | Burlison et al. |
| 7,716,094 B1 | 5/2010 | Sutter et al. |
| 7,747,484 B2 | 6/2010 | Stanley et al. |
| 7,778,895 B1 | 8/2010 | Baxter et al. |
| 7,818,222 B2 | 10/2010 | Allanson et al. |
| 7,836,406 B1 | 11/2010 | Kirsten et al. |
| 7,848,971 B1 | 12/2010 | Mori et al. |
| 7,849,405 B1 | 12/2010 | Coletta et al. |
| 7,860,763 B1 | 12/2010 | Quinn et al. |
| 7,904,356 B1 | 3/2011 | Cobarrubia |
| 7,930,226 B1 | 4/2011 | Quinn et al. |
| 8,001,006 B1 | 8/2011 | Yu et al. |
| 8,019,664 B1 | 9/2011 | Tifford et al. |
| 8,024,660 B1 | 9/2011 | Quinn et al. |
| 8,190,499 B1 | 5/2012 | McVickar |
| 8,204,805 B2 | 6/2012 | Eftekhari et al. |
| 8,346,635 B1 | 1/2013 | Olim |
| 8,407,113 B1 | 3/2013 | Eftekhari et al. |
| 8,417,596 B1 | 4/2013 | Dunbar et al. |
| 8,417,715 B1 | 4/2013 | Bruckhaus et al. |
| 8,418,920 B2 | 4/2013 | Lieberman et al. |
| 8,423,444 B1 | 4/2013 | Mackrell et al. |
| 8,429,184 B2 | 4/2013 | Ismalon |
| 8,433,627 B2 | 4/2013 | Agee et al. |
| 8,447,667 B1 | 5/2013 | Dinamani et al. |
| 8,452,676 B1 | 5/2013 | Talan et al. |
| 8,606,665 B1 | 12/2013 | Shaw |
| 8,635,127 B1 | 1/2014 | Shaw |
| 8,656,273 B1 | 2/2014 | Tifford et al. |
| 8,694,397 B2 | 4/2014 | Seubert et al. |
| 8,719,120 B1 | 5/2014 | McVickar et al. |
| 8,812,380 B2 | 8/2014 | Murray et al. |
| 8,857,713 B2 | 10/2014 | Lieberman et al. |
| 8,874,731 B1 | 10/2014 | Puppin |
| 8,903,810 B2 | 12/2014 | Ismalon |
| 8,942,999 B1 | 1/2015 | Fernando et al. |
| 9,037,962 B1 | 5/2015 | Vassar et al. |
| 9,069,580 B2 | 6/2015 | Armstrong et al. |
| 9,098,586 B1 | 8/2015 | Latif et al. |
| 9,117,247 B2 | 8/2015 | Lieberman et al. |
| 9,153,141 B1 | 10/2015 | Kane et al. |
| 9,280,252 B1 | 3/2016 | Brandmaier et al. |
| 9,286,282 B2 | 3/2016 | Ling et al. |
| 9,390,402 B1 | 7/2016 | Kane et al. |
| 9,406,089 B2 | 8/2016 | Mori et al. |
| 9,412,017 B1 | 8/2016 | Huang et al. |
| 9,444,824 B1 | 9/2016 | Balazs et al. |
| 9,916,626 B2 | 3/2018 | Huang et al. |
| 9,916,627 B1 | 3/2018 | Huang et al. |
| 9,959,560 B1 | 5/2018 | Whitaker et al. |
| 2002/0052774 A1 | 5/2002 | Parker et al. |
| 2002/0111888 A1 | 8/2002 | Stanley et al. |
| 2002/0133394 A1 | 9/2002 | Bushey et al. |
| 2004/0078271 A1 | 4/2004 | Morano et al. |
| 2005/0033735 A1 | 2/2005 | Shapiro |
| 2005/0054381 A1 | 3/2005 | Lee et al. |
| 2005/0144072 A1 | 6/2005 | Perkowski et al. |
| 2005/0160103 A1 | 7/2005 | Raffo |
| 2005/0210024 A1 | 9/2005 | Hurst-Hiller et al. |
| 2005/0246234 A1 | 11/2005 | Munyon |
| 2006/0075019 A1 | 4/2006 | Donovan et al. |
| 2006/0085306 A1 | 4/2006 | Schulte et al. |
| 2006/0085750 A1 | 4/2006 | Easton et al. |
| 2006/0122918 A1 | 6/2006 | Graboske et al. |
| 2006/0155632 A1 | 7/2006 | Cherkas et al. |
| 2006/0178961 A1 | 8/2006 | Stanley et al. |
| 2006/0184410 A1 | 8/2006 | Ramamurthy et al. |
| 2007/0033116 A1 | 2/2007 | Murray |
| 2008/0027979 A1 | 1/2008 | Chandrasekar et al. |
| 2008/0059900 A1 | 3/2008 | Murray et al. |
| 2008/0104045 A1 | 5/2008 | Cohen et al. |
| 2008/0119134 A1 | 5/2008 | Rao |
| 2008/0147494 A1 | 6/2008 | Larson |
| 2008/0189197 A1 | 8/2008 | Allanson et al. |
| 2008/0201206 A1 | 8/2008 | Pokorney et al. |
| 2008/0263643 A1 | 10/2008 | Jaiswal et al. |
| 2009/0076335 A1 | 3/2009 | Schwarzberg et al. |
| 2009/0099959 A1 | 4/2009 | Liao et al. |
| 2009/0307159 A1 | 12/2009 | Pinckney et al. |
| 2010/0010849 A1 | 1/2010 | Hurd |
| 2010/0017348 A1 | 1/2010 | Pinckney et al. |
| 2010/0023934 A1 | 1/2010 | Sheehan et al. |
| 2010/0063975 A1 | 3/2010 | Hayes |
| 2010/0262495 A1 | 10/2010 | Dumon et al. |
| 2010/0332362 A1 | 12/2010 | Ramsey et al. |
| 2011/0004537 A1 | 1/2011 | Allanson et al. |
| 2011/0078066 A1 | 3/2011 | Sherman et al. |
| 2011/0119264 A1 | 5/2011 | Hu et al. |
| 2011/0137776 A1 | 6/2011 | Goad et al. |
| 2011/0173116 A1 | 7/2011 | Yan et al. |
| 2011/0264569 A1 | 10/2011 | Houseworth et al. |
| 2012/0030159 A1 | 2/2012 | Pilaszy et al. |
| 2012/0030767 A1 | 2/2012 | Rippert et al. |
| 2012/0053965 A1 | 3/2012 | Hellman et al. |
| 2012/0084185 A1 | 4/2012 | Ciaramitaro et al. |
| 2012/0109792 A1 | 5/2012 | Eftekhari et al. |
| 2012/0136764 A1 | 5/2012 | Miller et al. |
| 2012/0211561 A1 | 8/2012 | Lieberman et al. |
| 2012/0215669 A1 | 8/2012 | Lieberman et al. |
| 2012/0278179 A1* | 11/2012 | Campbell .......... G06Q 30/0255 |
| | | 705/14.69 |
| 2012/0303495 A1 | 11/2012 | Murray |
| 2012/0324393 A1 | 12/2012 | Mbenkum et al. |
| 2013/0080302 A1 | 3/2013 | Allanson et al. |
| 2013/0091050 A1 | 4/2013 | Merrill et al. |
| 2013/0103420 A1 | 4/2013 | Massoumi et al. |
| 2013/0124644 A1 | 5/2013 | Hunt et al. |
| 2013/0198047 A1 | 8/2013 | Houseworth et al. |
| 2013/0254151 A1 | 9/2013 | Mohagheghi et al. |
| 2013/0282733 A1 | 10/2013 | Tawakol et al. |
| 2014/0027509 A1 | 1/2014 | Lieberman et al. |
| 2014/0075014 A1 | 3/2014 | Chourey |
| 2014/0101571 A1 | 4/2014 | Lewis |
| 2014/0156566 A1 | 6/2014 | Kabiljo et al. |
| 2014/0172656 A1 | 6/2014 | Shaw |
| 2014/0180883 A1 | 6/2014 | Regan |
| 2014/0201045 A1 | 7/2014 | Pai et al. |
| 2014/0214636 A1 | 7/2014 | Rajsky |
| 2014/0222702 A1 | 8/2014 | Jennings |
| 2014/0244455 A1 | 8/2014 | Huang et al. |
| 2014/0244456 A1 | 8/2014 | Huang et al. |
| 2014/0279190 A1 | 9/2014 | Severinghaus et al. |
| 2014/0279720 A1 | 9/2014 | Bhatia et al. |
| 2014/0314225 A1 | 10/2014 | Riahi et al. |
| 2014/0324648 A1 | 10/2014 | Mori et al. |
| 2014/0325664 A1 | 10/2014 | Nekhoroshev |
| 2014/0337189 A1 | 11/2014 | Barsade et al. |
| 2014/0337527 A1 | 11/2014 | Jain |
| 2014/0337753 A1 | 11/2014 | McKellar et al. |
| 2014/0380179 A1 | 12/2014 | Bose et al. |
| 2015/0007065 A1 | 1/2015 | Krishnamoorthy et al. |
| 2015/0026146 A1 | 1/2015 | Mance |
| 2015/0099255 A1 | 4/2015 | Aslan et al. |
| 2015/0112767 A1 | 4/2015 | Shatzkamer et al. |
| 2015/0149877 A1 | 5/2015 | Ling et al. |
| 2015/0178371 A1 | 6/2015 | Seth et al. |
| 2015/0332167 A1 | 11/2015 | Kaushal et al. |
| 2015/0363875 A1 | 12/2015 | Guerry |
| 2016/0034853 A1 | 2/2016 | Wang et al. |
| 2016/0078567 A1 | 3/2016 | Goldman et al. |
| 2016/0098804 A1 | 4/2016 | Mascaro et al. |
| 2016/0125552 A1 | 5/2016 | Pathak et al. |
| 2016/0148322 A1 | 5/2016 | Mascaro et al. |
| 2016/0180470 A1 | 6/2016 | Mascaro et al. |
| 2016/0217533 A1 | 7/2016 | Laaser |
| 2016/0217534 A1 | 7/2016 | Goldman et al. |
| 2016/0246762 A1* | 8/2016 | Eaton ...................... G09G 5/30 |
| 2016/0247239 A1* | 8/2016 | Houseworth ........ G06Q 40/123 |
| 2016/0275627 A1 | 9/2016 | Wang et al. |
| 2016/0292217 A1 | 10/2016 | Sinha et al. |
| 2016/0306846 A1 | 10/2016 | Adams, Jr. et al. |
| 2016/0328804 A1 | 11/2016 | Mori et al. |

(56) References Cited

U.S. PATENT DOCUMENTS

2016/0328805 A1    11/2016  Mori et al.
2016/0328806 A1    11/2016  Mori et al.
2017/0004585 A1     1/2017  Dang et al.
2017/0132314 A1     5/2017  Liu et al.

OTHER PUBLICATIONS

Forsati, R.; "Web Page Personalization Based on Weighted Association Rules," 2009 International Conference on Electronic Computer Technology, pp. 130-135.
Anders, B. Susan; "Website of the Month: MSN Money Tax Center," Apr. 2013, The CPA Journal, pp. 72-73.
Publication 559: Final Income Tax Return for Decedent—Form 1040, p. 2, paragraph 2; https://taxmap.ntis.gov/taxmap/pub/p559-001.htm; retrieved from the Internet Jul. 11, 2017.
U.S. Appl. No. 60/608,035, filed Sep. 7, 2004, Quinn et al.
"Modular Programming," Wikipedia, the free encyclopedia, Jul. 29, 2014, http://en.wikipedia.org/w/index.php?title=Modular_programming&oldid=618953117, retrieved from the Internet on Mar. 31, 2015, 4 pages.
Laaser et al., "Method and System for Applying Predictive Models to Reduce Task Abandonment by a User," U.S. Appl. No. 14/529,317, filed Oct. 31, 2014.
Laaser et al., "Identification of Electronic Tax Return Errors Based on Declarative Constraints," U.S. Appl. No. 14/530,305, filed Oct. 31, 2014.
Goldman et al., "Predictive Model Based Identification of Potential Errors in Electronic Tax Return," U.S. Appl. No. 14/530,369, filed Oct. 31, 2014.
Laaser et al., "Method and System for Identifying Product Defects Within a Tax Return Preparation System," U.S. Appl. No. 14/607,935, filed Jan. 28, 2015.
Laaser et al., "Method and System for Assisting Tax Return Preparers with the Preparation of Tax Returns for Client Tax Filers," U.S. Appl. No. 14/634,219, filed Feb. 27, 2015.
Cabrera et al., "Method and System for Providing a Personalized Recommendation for a Tax Return Preparer," U.S. Appl. No. 14/670,986, filed Mar. 27, 2015.
Laaser et al., "Methods, Systems and Computer Program Products for Calculating an Estimated Result of a Tax Return," U.S. Appl. No. 14/674,582, filed Mar. 31, 2015.
Laaser et al., "Systems for Identifying Abandonment Indicators for an Electronic Tax Return Preparation Program," U.S. Appl. No. 14/698,645, filed Apr. 28, 2015.

\* cited by examiner

METHOD AND SYSTEM FOR PROVIDING AN ANALYTICS MODEL ARCHITECTURE TO REDUCE ABANDONMENT OF TAX RETURN PREPARATION SESSIONS BY POTENTIAL CUSTOMERS

BACKGROUND

Federal and State Tax law has become so complex that it is now estimated that each year Americans alone use over 6 billion person hours, and spend nearly 4 billion dollars, in an effort to comply with Federal and State Tax statutes. Given this level of complexity and cost, it is not surprising that more and more taxpayers find it necessary to obtain help, in one form or another, to prepare their taxes. Tax return preparation systems, such as tax return preparation software programs and applications, represent a potentially flexible, highly accessible, and affordable source of tax preparation assistance. However, traditional tax return preparation systems are, by design, fairly generic in nature and often lack the malleability to meet the specific needs of a given user.

For instance, traditional tax return preparation systems often present a fixed, e.g., predetermined and pre-packaged, structure or sequence of questions to all users as part of the tax return preparation interview process. This is largely due to the fact that the traditional tax return preparation system analytics use a sequence of interview questions, and/or other user experiences, that are static features and that are typically hard-coded elements of the tax return preparation system and do not lend themselves to effective or efficient modification. As a result, the user experience, and any analysis associated with the interview process and user experience, is a largely inflexible component of a given version of the tax return preparation system. Consequently, the interview processes and/or the user experience of traditional tax return preparation systems can only be modified through a redeployment of the tax return preparation system itself. Therefore, there is little or no opportunity for any analytics associated with interview process, and/or user experience, to evolve to meet a changing situation or the particular needs of a given taxpayer, even as more information about that taxpayer, and their particular circumstances, is obtained.

As an example, using traditional tax return preparation systems, the sequence of questions, and the other user experience elements, presented to a user is pre-determined based on a generic user model that is, in fact and by design, not accurately representative of any "real world" user. Consequently, irrelevant, and often confusing, interview questions are virtually always presented to any given real world user. It is therefore not surprising that many users, if not all users, of these traditional tax return preparation systems experience, at best, an impersonal, unnecessarily long, confusing, and complicated, interview process and user experience. Clearly, this is not the type of impression that results in happy, loyal, repeat customers.

Even worse is the fact that, in many cases, the hard-coded and static analysis features associated with traditional tax return preparation systems, and the resulting presentation of irrelevant questioning and user experiences, leads potential users of traditional tax return preparation systems, i.e., potential customers, to believe that the tax return preparation system is not applicable to them, and perhaps is unable to meet their specific needs. In other cases, the users simply become frustrated with these irrelevant lines of questioning and other user experience elements. Many of these potential users and customers then simply abandon the process and the tax return preparation systems completely, i.e., never become paying customers. Furthermore, the potential customers do not become proponents for the tax return preparation systems (e.g., by promoting the product to their friends and family), and may instead become opponents to the tax return preparation systems (e.g., by recommending against the use of the systems). Clearly, this is an undesirable result for both the potential user of the tax return preparation system and the provider of the tax return preparation system.

What is needed is a method and system for personalizing the tax return preparation process by presenting questions to users that both build the users' confidence in the tax return preparation system and that gather information from the users for preparing the users' tax returns.

SUMMARY

Embodiments of the present disclosure address some of the shortcomings associated with traditional tax return preparation systems by providing an analytics model architecture that is configured to personalize the tax return preparation process for a user, to retain the user as a customer or to convert the user from a potential customer to a paying customer, according to one embodiment. Some tax return preparation systems employ a 'try before you buy' marketing strategy that allows use of at least some of the features of a tax return preparation system, before the user commits to paying for the service. In 'try before you buy' systems, a potential customer has the opportunity to closely evaluate and judge the quality, applicability, and experience associated with tax return preparation system before converting (e.g., by purchasing the service) into a paying customer. In these systems and environments (as well as in non-'try before you buy' systems), managing the user's perception can play just as important a role in user satisfaction as the substantive function of a tax return preparation system. According to one embodiment, a tax return preparation system is configured to personalize questions presented to a user based on information obtained about the user, and to iteratively present questions to the user based on the user's responses to previous questions, so that the user receives questions that are relevant to the user's particular situation, according to one embodiment. The tax return preparation system is also configured to determine which questions are highly likely to receive an affirmative response from the user, and is configured to selectively provide these questions to the user to maintain and/or improve the user's confidence in the tax return's ability to understand and/or address the user's particular tax situation, according to one embodiment. The tax return preparation system uses existing/historic tax return data to build multiple analytics (e.g., predictive) models, according to one embodiment. The tax return preparation system uses two or more cascaded analytics models to evaluate user information and user responses to questions, to personalize the selection and presentation of questions to the user while progressing the user through a tax return preparation session, according to one embodiment.

There are a number of techniques that can be used to progress the user through the tax return preparation session, with personalized questions, to reduce the likelihood that the user will abandon filing his/her tax return with the tax return preparation system, according to one embodiment. In one particular example, the tax return preparation system presents a few basic questions to the user to obtain general information about the user. The general information about the user is provided to an analytics module, which generates a first set of questions based on the general information about the user, according to one embodiment. The analytics module returns the first set of questions to the user for response, according to one embodiment. The tax return preparation system then feeds the responses to the first set of questions to the analytics module, which generates a second set of questions based on the responses to the first set of questions, according to one embodiment. The tax return preparation system can iteratively and repeatedly use the analytics module to generate multiple sets of questions that are personalized to the user, based on information gathered about the user or provided to the tax return preparation system by the user, according to one embodiment. The analytics module is included within the tax return preparation system, according to one embodiment. The analytics module is centralized within a service provider computing environment and is used by the tax return preparation system and other service provider applications to provide analytics services and/or predictive model services within the service provider computing environment, according to another embodiment. These and other embodiments are disclosed in more detail below.

By providing questions during tax return preparation sessions that are personalized to a particular user, implementation of embodiments of the present disclosure allows for significant improvement to the fields of user experience, electronic tax return preparation, data collection, and data processing, according to one embodiment. As one illustrative example, by presenting questions that are based on user data and user responses to previous questions (e.g., as determined by multiple or cascaded analytics models), the tax return preparation system reduces the presentation of less-relevant and irrelevant questions such that implementation of embodiments of the present disclosure allows for progressing a user through a tax return preparation session with fewer processing cycles and less communications bandwidth. As a result, embodiments of the present disclosure allow for improved processor performance, more efficient use of memory access and data storage capabilities, reduced communication channel bandwidth utilization, and faster communications connections. Consequently, computing and communication systems implementing and/or providing the embodiments of the present disclosure are transformed into faster and more operationally efficient devices and systems.

In addition to improving overall computing performance, by using analytics models (e.g., predictive models) to select relevant questions for a user, implementation of embodiments of the present disclosure represent a significant improvement to the field of providing an efficient user experience and, in particular, efficient use of human and non-human resources. As one illustrative example, by reducing the number of irrelevant questions provided to a user of a tax return preparation system, the user can devote less time and energy to preparing his/her taxes. Additionally, by selectively presenting questions to a user that have a high likelihood of an affirmative answer (from the user), the tax return preparation system maintains, improves, and/or increases the likelihood that a potential customer will convert into a paying customer because the potential customer is receiving confirmation that the tax return preparation system appears to understand the particular user's tax situation, according to one embodiment. Consequently, using embodiments of the present disclosure, the user experience is less burdensome and time consuming and allows the user to dedicate more of his or her time to other activities or endeavors, while having confidence that the tax return preparation system is adequately addressing tax-related issues that are pertinent to the user.

Common reference numerals are used throughout the FIG.s and the detailed description to indicate like elements. One skilled in the art will readily recognize that the above FIG.s are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments.

Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

The INTRODUCTORY SYSTEM, HARDWARE ARCHITECTURE, and PROCESS sections herein describe systems and processes suitable for applying analytics models (e.g., predictive models) to questions within a tax return preparation system to determine personalize questions presented to a user to reduce the likelihood of the user abandoning the tax return preparation process, according to various embodiments.

Introductory System

Herein, the term "production environment" includes the various components, or assets, used to deploy, implement, access, and use, a given application as that application is intended to be used. In various embodiments, production environments include multiple assets that are combined, communicatively coupled, virtually and/or physically connected, and/or associated with one another, to provide the production environment implementing the application.

As specific illustrative examples, the assets making up a given production environment can include, but are not limited to, one or more computing environments used to implement the application in the production environment such as a data center, a cloud computing environment, a dedicated hosting environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems, used to monitor and control assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer, data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; and/or any other assets/components making up an actual production environment in which an application is deployed, implemented, accessed, and run, e.g., operated, as discussed herein, and/or as known in the art at the time of filing, and/or as developed after the time of filing.

As used herein, the terms "computing system," "computing device," and "computing entity," include, but are not limited to, a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms "computing system" and "computing entity," can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate an application.

In various embodiments, one or more cloud computing environments are used to create, and/or deploy, and/or operate an application that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given application or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing, can be implemented as one or more virtual assets.

In one embodiment, two or more assets, such as computing systems and/or virtual assets, and/or two or more computing environments, are connected by one or more communications channels including but not limited to, Secure Sockets Layer (SSL) communications channels and various other secure communications channels, and/or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user" includes, but is not limited to, any party, parties, entity, and/or entities using, or otherwise interacting with any of the methods or systems discussed herein. For instance, in various embodiments, a user can be, but is not limited to, a person, a commercial entity, an application, a service, and/or a computing system.

As used herein, the terms "interview" and "interview process" include, but are not limited to, an electronic, software-based, and/or automated delivery of multiple questions to a user and an electronic, software-based, and/or automated receipt of responses from the user to the questions, to progress a user through one or more groups or topics of questions, according to various embodiments.

As used herein, the term "user experience" includes not only the interview process, interview process questioning, and interview process questioning sequence, but also other user experience features provided or displayed to the user such as, but not limited to, interfaces, images, assistance resources, backgrounds, avatars, highlighting mechanisms, icons, and any other features that individually, or in combination, create a user experience, as discussed herein, and/or as known in the art at the time of filing, and/or as developed after the time of filing.

Hardware Architecture

Figure 1:
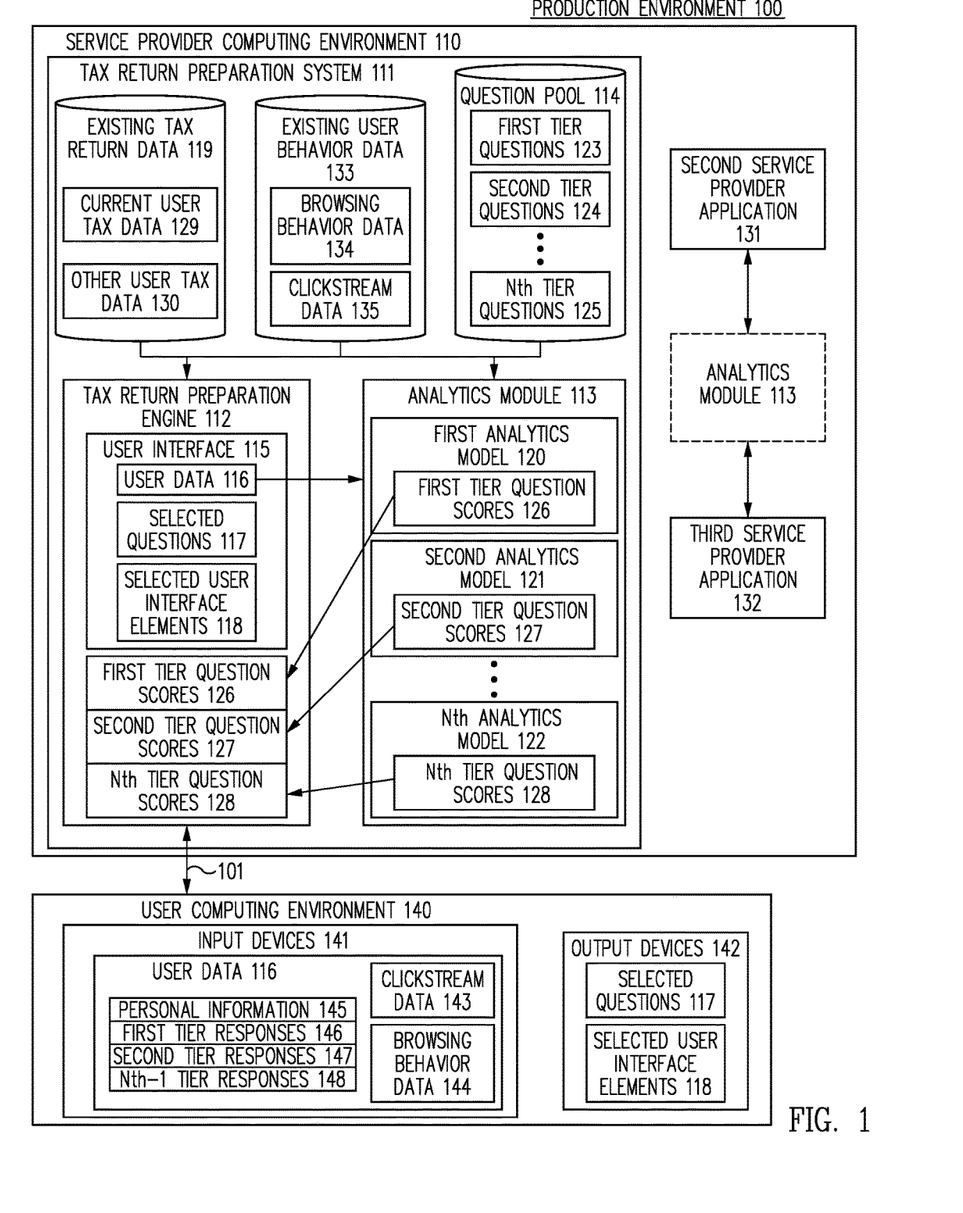
FIG. 1 is a block diagram of software architecture for providing an analytics model architecture that is configured to personalize a tax return preparation process for a user, in accordance with one embodiment.

FIG. 1 illustrates a block diagram of a production environment 100 for providing an analytics model architecture that is configured to personalize the tax return preparation process for a user, to retain the user as a customer or to convert the user from a potential customer to a paying customer, according to one embodiment. According to one embodiment, the production environment 100 is configured to personalize questions presented to a user based on information obtained about the user, and to iteratively present questions to the user based on the user's responses to previous questions, so that the user receives questions that are relevant to the user's particular situation, according to one embodiment. The production environment 100 is also configured to determine which questions are highly likely to receive an affirmative response from the user, and is configured to selectively provide these questions to the user to maintain and/or improve the user's confidence in the tax return's ability to understand and/or address the user's particular tax situation, according to one embodiment. The tax return preparation system uses existing/historic tax return data to build multiple analytics (e.g., predictive) models, according to one embodiment. The tax return preparation system uses two or more cascaded analytics models to evaluate user information and user responses to questions, to personalize the selection and presentation of questions to the user while progressing the user through a tax return preparation session, according to one embodiment. These and additional embodiments are disclosed in more detail below.

By providing questions during tax return preparation sessions that are personalized to a particular user, implementation of embodiments of the present disclosure allows for significant improvement to the fields of user experience, electronic tax return preparation, data collection, and data processing, according to one embodiment. As one illustrative example, by presenting questions that are based on user data and user responses to previous questions (e.g., as determined by multiple or cascaded analytics models), the tax return preparation system reduces the presentation of less-relevant and irrelevant questions such that implementation of embodiments of the present disclosure allows for progressing a user through a tax return preparation session with fewer processing cycles and less communications bandwidth. As a result, embodiments of the present disclosure allow for improved processor performance, more efficient use of memory access and data storage capabilities, reduced communication channel bandwidth utilization, and faster communications connections. Consequently, computing and communication systems implementing and/or providing the embodiments of the present disclosure are transformed into faster and more operationally efficient devices and systems.

In addition to improving overall computing performance, by using analytics models (e.g., predictive models) to select relevant questions for a user, implementation of embodiments of the present disclosure represent a significant improvement to the field of providing an efficient user experience and, in particular, efficient use of human and non-human resources. As one illustrative example, by reducing the number of irrelevant questions provided to a user of a tax return preparation system, the user can devote less time and energy to preparing his/her taxes. Additionally, by selectively presenting questions to a user that have a high likelihood of an affirmative answer (from the user), the tax return preparation system maintains, improves, and/or increases the likelihood that a potential customer will convert into a paying customer because the potential customer is receiving confirmation that the tax return preparation system appears to understand the particular user's tax situation, according to one embodiment. Consequently, using embodiments of the present disclosure, the user experience is less burdensome and time consuming and allows the user to dedicate more of his or her time to other activities or endeavors, while having confidence that the tax return preparation system is adequately addressing tax-related issues that are pertinent to the user.

The production environment 100 includes a service provider computing environment 110 and a user computing environment 140 for individualizing tax return preparation sessions for a user, according to one embodiment. The computing environments 110 and 140 are communicatively coupled to each other with a communication channel 101, according to one embodiment.

The service provider computing environment 110 represents one or more computing systems such as, but not limited to, a server, a computing cabinet, and/or distribution center that is configured to receive, execute, and host one or more applications for access by one or more users, e.g., clients of the service provider, according to one embodiment. The service provider computing environment 110 represents a traditional data center computing environment, a virtual asset computing environment (e.g., a cloud computing environment), or a hybrid between a traditional data center computing environment and a virtual asset computing environment, according to one embodiment. The one or more applications can include, but are not limited to tax return preparation systems, other financial management systems, and applications that support the tax return preparation systems and/or the other financial management systems, according to one embodiment. The service provider computing environment 110 includes a tax return preparation system 111 that utilizes multiple analytics models to generate multiple sets of questions that are based on the user's data and user's responses to some of the sets of questions, to personalize one or more tax return preparation sessions for the user. By personalizing the sets of questions and the tax return preparation sessions, the service provider computing environment 110 may reduce a likelihood of abandonment of the tax return preparation process, according to one embodiment. The tax return preparation system 111 includes various components, databases, engines, modules, and data to support personalizing tax return preparation sessions for a user, according to one embodiment. The tax return preparation system 111 includes a tax return preparation engine 112, an analytics module 113, and a question pool 114, according to one embodiment.

The tax return preparation engine 112 guides the user through the tax return preparation process by presenting the user with questions and user interface elements, according to one embodiment. The tax return preparation process includes progressing a user through a tax return preparation interview, according to one embodiment. The tax return preparation interview can be broken into multiple tax return preparation sessions, during which the user accesses or "logs into" the tax return preparation system 111, according to one embodiment. A user may access or login to the tax return preparation system 111 multiple times, e.g., in multiple sessions, to complete a tax return preparation interview. At the end of a tax return preparation interview, the tax return preparation system 111 files a federal tax return, and may file one or more state tax returns (as needed), in response to receiving instructions from the user to do so, according to one embodiment. Thus, the tax return preparation process can include, but is not limited to: completing a tax return preparation interview to enable the tax return preparation system 111 to complete/prepare a tax return for the user, and filing one or more federal and state tax returns, according to one embodiment. The completion and filing of the one or more federal and state tax returns are processed over one or more tax return preparation sessions, in which the user accesses or logs into the tax return preparation system 111, according to one embodiment.

The tax return preparation engine 112 includes a user interface 115 to gather and receive user data 116 from the user and to present selected questions 117 and selected user interface elements 118 to the user, to progress the user through the tax return preparation process, according to one embodiment. The user interface 115 includes one or more user experience elements and graphical user interface tools, such as, but not limited to, buttons, slides, dialog boxes, text boxes, drop-down menus, banners, tabs, directory trees, links, audio content, video content, and/or other multimedia content for communicating information to the user and for receiving the user data 116 from the user, according to one embodiment.

The tax return preparation engine 112 employs the user interface 115 to receive the user data 116 from input devices 141 of the user computing environment 140 and employs the user interface 115 to transmit the selected questions 117 and selected user interface elements 118 to output devices 142 of the user computing environment 140, according to one embodiment. The input devices 141 include, but are not limited to, touchscreens, mice, keyboards, microphones, cameras, touchpads, and the like, and are configured to receive various types of user data 116, according to one embodiment. For example, the input devices 141 gather user data 116 such as clickstream data 143, browsing behavior data 144, and personal information 145, according to one embodiment. The user data 116 can also include various responses to various types of questions presented by the tax return preparation system 111. As will be discussed in further detail below, the tax return preparation system 111 provides various tiers/subsets of questions to progress the user through his/her tax return preparation, and the user data 116 includes the various tiers/subsets of responses to the presented questions, according to one embodiment. In one particular example, the user data 116 includes first tier responses 146, second tier responses 147, and Nth-1 tier responses 148, which are responses to first tier questions, second tier questions, and Nth-1 tier questions that may be presented to the user, according to one embodiment. The output devices 142 include, but are not limited to, monitors, speakers, touchscreens, and the like, according to one embodiment. The output devices 142 display/present the selected questions 117 and the selected user interface elements 118 to the user, as provided by the tax return preparation system 111, according to one embodiment.

The user data 116 within the user interface 115 represents both the information that is obtained from the user through the user computing environment 140, as well as information that is obtained from other sources, according to one embodiment. For example, the user data 116 can include information from existing tax return data 119, such as one or more previous years' tax return data for a particular user. The existing tax return data 119 is stored in a data store, a database, and/or a data structure, according to one embodiment. The user data 116 can also include information that the tax return preparation system gathers directly from one or more external sources such as, but not limited to, a payroll management company, state agencies, federal agencies, employers, military records, public records, private companies, and the like, according to one embodiment. More particular examples of the user data 116 include, but are not limited to, a user's name, a Social Security number, government identification, a driver's license number, a date of birth, an address, a zip code, a home ownership status, a marital status, an annual income, a job title, an employer's address, spousal information, children's information, asset information, medical history, occupation, information regarding dependents, salary and wages, interest income, dividend income, business income, farm income, capital gain income, pension income, IRA distributions, unemployment compensation, education expenses, health savings account deductions, moving expenses, IRA deductions, student loan interest deductions, tuition and fees, medical and dental expenses, state and local taxes, real estate taxes, personal property tax, mortgage interest, charitable contributions, casualty and theft losses, unreimbursed employee expenses, alternative minimum tax, foreign tax credit, education tax credits, retirement savings contribution, child tax credits, residential energy credits, and any other information that is currently used, that can be used, or that may be used in the future, in a financial system or in the preparation of a user's tax return, according to various embodiments. In some implementations, the user data 116 is a subset of all of the user information used by the tax return preparation system 111 to prepare the user's tax return, e.g., is limited to marital status, children's information, and annual income. The user data 116 can also include browsing behavior data 144 that is obtained from the user's interaction with the user interface 115 of the tax return preparation system 111, and can also include information obtained from Internet advertising companies, public records servers, social media servers, and the like, according to one embodiment. The user data 116 can include the user's clickstream data 143 and can therefore dynamically change as the user enters additional information, as the user pauses, and as the user mouses over various sections of a webpage, according to one embodiment. In other words, the tax return preparation engine 112 can be periodically or continuously receiving, updating, and transmitting the user data 116 for use by the analytics module 113 to personalize the tax return preparation process by determining which questions from the question pool 114 will help the user complete and file his/her tax return using the tax return preparation system 111, according to one embodiment. The question pool 114 includes a data store, a database, and/or some type of data structure to store the questions, according to one embodiment.

The tax return preparation engine 112 presents selected questions 117 based on questions scores that are generated by the analytics module 113, according to one embodiment. The tax return preparation engine 112 receives the selected questions 117 from the analytics module 113 for presentation to the user, according to one embodiment. In another embodiment, the tax return preparation engine receives scores from the analytics module 113, and the scores correspond to the applicability or relevance of the questions to a particular user. If the tax return preparation engine 112 receives scores for questions from the analytics module 113, the tax return preparation engine 112 is configured to retrieve questions having the highest scores from the question pool 114, and displaying the selected questions 117 in the user interface 115 for response by the user, according to one embodiment.

The selected user interface elements 118 are identified by or received from the analytics module 113 based on the user data 116, e.g., personal information and/or responses to questions, according to one embodiment. Analytics module 113 can be configured to select user interface elements for display to the user to assist the user in having a more personalized and positive experience during the tax return preparation process, according to one embodiment. Because some users may have an easier time understanding or interacting with one user interface over another user interface, the analytics module 113 can be configured to select particular user interface elements for presentation to the user, according to one embodiment. The selected user interface elements 118 can include, but are not limited to, the font sizes used while presenting information to the user, the length of descriptions provided to the user, themes presented during the interview process, the types of icons displayed to the user, the type of interface format presented to the user, images displayed to the user, assistance resources listed and/or recommended to the user, background colors and patterns, avatars presented to the user, highlighting mechanisms, and any other features that individually, or in combination, create a user experience, as discussed herein, and/or as known in the art at the time of filing, and/or as developed after the time of filing, that are displayed in, or as part of, the user interface 115, according to various embodiments.

The analytics module 113 selects questions that perform at least two functions when presented to a user, according to one embodiment. First, the analytics module 113 selects questions that increase or maintain a user's confidence in the tax return preparation system 111, according to one embodiment. Second, the analytics module 113 selects questions that provide the tax return preparation system 111 with more information about the user, to enable the tax return preparation system 111 to further personalize the tax return preparation interview and/or to enable the tax return preparation system 111 to complete the user's tax return, according to one embodiment.

The analytics module 113 selects questions for presentation to the user based on the user data 116, according to one embodiment. The analytics module 113 uses multiple analytics models that are logically and/or sequentially cascaded together within the analytics module 113, to select questions for presentation to the user, according to one embodiment. The analytics module 113 includes a first analytics model 120, a second analytics model 121, and can include multiple analytics models up to an Nth analytics model 122, according to one embodiment. Although three analytics models 120, 121, 122 are illustrated, the models are illustrated to be representative of two or more analytics models within the analytics module 113, according to one embodiment. According to one embodiment, each of the analytics models 120, 121, 122 includes one or more sub-models for scoring questions from the question pool 114. In one embodiment, the user data provided to one of the analytics models 120, 121, 122 is different than the user data provided to another of the analytics models 120, 121, 122 (e.g., because more user data 116 can be collected between user of one model and another).

The analytics module 113 selects questions from the question pool 114, for presentation to the user, according to one embodiment. The question pool 114 includes first tier questions 123, second tier questions 124, and can include multiple tiers or sets of questions, up to Nth tier questions 125, according to one embodiment. Although three tiers of questions are illustrated, it is to be understood that the questions 123, 124, 125 are illustrated to be representative of two or more tiers or sets of questions within the question pool 114 and within the tax return preparation system 111, according to one embodiment. In one embodiment, the first tier questions 123 are a different set of questions than the second tier questions 124, and the first tier questions 123 and the second tier questions 124 are different sets of questions than the Nth tier questions 125 and different than any other tier of questions, according to one embodiment. In another embodiment, the first tier questions 123 are a subset of the remaining tiers of questions, the second tier questions 124 are inclusive of the first tier questions 123 and are a subset of other tiers of questions, and the Nth tier questions 125 include the first tier questions 123, the second tier questions 124, and any other lower tier questions, according to one embodiment. In another embodiment, each of the tiers of questions 123, 124, and 125 can include at least some of the questions from one or more of the other tiers of questions 123, 124, and 125. For example, the second tier questions 124 can include at least some of the first tier questions 123, and the Nth tier questions 125 can include at least some of the first tier questions 123 and/or at least some of the second tier questions 124, according to one embodiment. The first tier questions 123 represent questions that the tax return preparation system 111 provides to the user in response to receiving the personal information 145 from the user data 116 for the user, according to one embodiment. In one embodiment, the personal information 145 is a group of information consisting of a zip code, a filing status, an occupation, an age, and a number of dependents. The first tier questions 123 include, but are not limited to, questions relating to whether the user: had a job, owned a business, sold stocks, made donations to charity, received dividends, had student loan interest, bank account interest, made a retirement plan withdrawal, had car-related expenses, had job-related expenses, had affordable care act expenses, and supported a family member, according to one embodiment.

The second tier questions 124 represent questions that the tax return preparation system 111 provides to the user in response to receiving the personal information 145 and the first tier responses 146 from the user data 116 for the user, according to one embodiment. The first tier responses 146 are the user's responses to the first tier questions 123, according to one embodiment. The second tier questions 124 include, but are not limited to, questions relating to whether the user: had a side job, received unemployment, went to college, receives Social Security, had medical expenses, had a foreign bank account, had a farm, received/paid alimony, contributed to retirement savings, incurred moving expenses, received gambling income, had a rental property, sold a business, had carryover expenses, lost a family member, had a new baby, sold a home, refinanced a home, purchased a home, had a child leave home, was divorced, got married, had financial losses, was in the military, received income from multiple states, made large purchases, received medicare, started school, graduated from school, and/or sold an asset, according to one embodiment. The second tier questions 124 also include one or more of the first tier questions 123 that were not previously presented to the user as the selected questions 117, according to one embodiment.

The Nth tier questions 125 represent questions that the tax return preparation system 111 provides to the user in response to receiving the personal information 145, the first tier responses 146, the second tier responses 147, and/or other responses up to the Nth−1 tier responses, from the user data 116 for the user, according to one embodiment. The Nth−1 tier responses 148 are the user's responses to the Nth−1 tier questions (e.g., the second tier questions 124 or tiers of questions between the second tier and the Nth tier), according to one embodiment. The Nth tier questions 125 include, but are not limited to, any of the first tier questions 123 and/or any of the tiers of questions that are between the first tier and the Nth tier of questions that have not yet been presented to the user, according to one embodiment. The Nth tier questions 125 can also include other questions related to the income and/or deductions or credits available to the user, as determined by the tax return preparation system 111, according to one embodiment.

Each of the analytics models 120, 121, 122 receives one or more inputs and generates an output, according to one embodiment. The one or more inputs include, but are not limited to, the personal information 145, the first tier responses 146, the second tier responses 147, and the Nth−1 tier responses 148, according to one embodiment. The output of each of the analytics models is a relevance score, ranking score, questions score, or other prioritization of relevance for the questions of the question pool 114, as they relate to a current user, according to one embodiment. To illustrate, the first analytics model 120 receives the personal information 145 from the tax return preparation engine 112 and generates first tier question scores 126 to indicate which of the first tier questions 123 are well-suited, best-suited, and/or recommended for presentation to the user, at least partially based on information received from the user, according to one embodiment. The analytics module 113 delivers the first tier question scores 126 to the tax return preparation engine 112, and the tax return preparation engine 112 determines the content of the selected questions 117 using the first tier question scores 126, according to one embodiment. The tax return preparation engine 112 can use the first tier question scores 126 to retrieve one or more of the selected questions 117 from the first tier questions 123 within the question pool 114, according to one embodiment. The second analytics model 121 receives the personal information 145 and the first tier responses 146 (e.g., the response to the first tier questions 123 that were presented to the user), and generates second tier question scores 127 for determining which of the second tier questions 124 and which of the first tier questions 123 to present to the user. The Nth analytics model 122 receives the personal information 145, the first tier responses 146, the second tier responses 147, and/or the Nth−1 tier responses 148, and generates Nth tier question scores 128 for determining which of the Nth tier questions 125 (inclusive of one or more second tier questions 124 and first tier questions 123) to present to the user, according to one embodiment. The tax return preparation engine 112, or another part of the tax return preparation system 111, uses the tier question scores 126, 127, and/or 128 to determine which of the questions in the question pool 114 are presented to a user as the selected questions 117, according to one embodiment. In one embodiment, the analytics module 113 uses the first analytics model 120 before using the second analytics model 121, and the analytics module 113 uses the second analytics model 121 before using another subsequent analytics model, in the architecture of cascaded analytics models. In one embodiment, the analytics models are in a cascaded architecture within the analytics module 113. In one embodiment, the first analytics model 120 is used to select higher-level and/or less-detailed questions for presentation to the user before the second analytics model 121 is used to select more-detailed questions for presentation to the user, according to one embodiment.

The analytics module 113 uses slightly different techniques for presenting questions to a returning user, than are used for presenting questions to a first time user, according to one embodiment. For example, the analytics module 113 can retrieve the current user tax data 129 for one or more previous years from the existing tax return data 119 in order to gather personal information, occupation, approximate income, retirement information, investment information, dependent information, marital status, and other information for a current user, according to one embodiment. Thus, the analytics module 113 may use the current user tax data 129 from one or more previous years' tax returns to bypass one or more tiers of questions (e.g., the first tier questions 123) and to bypass one or more high-level or introductory analytics models, according to one embodiment. In the case of a returning user, the analytics module 113 processes the current user tax data 129 for a returning user, and uses the analytics models to provide fewer questions than are provided to a first time user, so the tax return preparation system 111 can uses less time becoming familiar with a user for whom information is already on file, according to one embodiment. In other words, the tax return preparation system 111 can assume that a returning user already has confidence in the ability of the tax return preparation system 111 because the user is a repeat customer for the services provided by the tax return preparation system 111. Therefore, the analytics module 113 may reduce the number of questions presented to the user that perform the function of building the user's confidence and can substantially limit the questions to those that help the tax return preparation system 111 prepare the user's tax return, according to one embodiment. In one embodiment, the analytics module 113 uses different questions for returning users than are used for first-time users.

The analytics module 113 can use a variety of techniques for supporting the presentation of the selected questions 117 to the user computing environment 140. For example, instead of generating and providing question scores to the tax return preparation engine 112, the analytics module 113 can be alternatively configured to retrieve questions from the question pool 114 that are associated with the highest of the question scores, and can be configured to provide the questions having the highest scores to the tax return preparation engine 112 for presentation to the user, according to one embodiment.

The analytics module 113 and/or analytics models 120, 121, and/or 122 can be configured to use the user data 116 (e.g. the personal information 145 and the responses 146-148) to select one or more user interface elements, user interface themes, and/or user interface profiles, according to one embodiment. Because different education levels, occupations, computer experience, and sometimes salary ranges may correlate with the user's reading comprehension and use of software, different user interface profiles may be more/less effective with different types or profiles of users. The user interface elements, user interface themes, and/or user interface profiles are presented to the user as the selected user interface elements 118 to assist the user in having a positive user experience during the tax return preparation process, according to one embodiment.

The tax return preparation system 111 is configured to use one or more of a variety of techniques for creating the analytics models, according to various embodiments. In one embodiment, the analytics module 113 or another component within the tax return preparation system 111 analyzes the existing tax return data 119 to generate, define, update, and/or initialize one or more of the analytics models 120, 121, and 122. In one embodiment, the tax return preparation system 111 (e.g., the analytics module 113) uses other user tax data 130 (as distinguished from current user tax data 129) to generate, define, update, and/or initialize one or more of the analytics models 120, 121, 122. The tax return preparation system 111 creates, generates, and/or trains one or more of the analytics models 120, 121, and 122 (e.g., predictive models) based on at least part of the existing tax return data 119 (i.e., the other user tax data 130 and/or the current user tax data 129). In one embodiment, the tax return preparation system or the analytics module 113 creates, generates, and/or trains one or more of the analytics models 120, 121, and 122 (e.g., predictive models) based on at least part of the existing user behavior data 133 (e.g., the browsing behavior data 134 and/or the clickstream data 135). The existing user behavior data 133 is stored in a data store, database, and/or data structure and is gathered during one or more previous sessions (e.g., previous years' sessions) of a user with the tax return preparation system 111, according to one embodiment. In one embodiment, the tax return preparation system 111 uses machine learning or another similar technique for generating the predictive models/analytic models. By analyzing existing tax return data 119 or the existing user behavior data 133, e.g., from one or more previous years' tax return data, the tax return preparation system 111 can determine one or more logical, statistical, and mathematical relationships or correlations between tax-related questions and between one or more of the following: previous years' life events, future life events, previous years' tax situations, future tax situations, the life events for the tax year of interest, and the tax situations for that tax year of interest, according to one embodiment. Future life events and future tax situations are those that occurred between the end of the tax year of interest and the time that the user prepares his/her tax return (e.g., marriage, new child, home purchase, divorce, etc.), according to one embodiment. Thus, analytics models 120, 121, and 122 are generated to determine relevant/effective questions for a user based on information gathered from the user and based on an analysis of previous years' tax data, according to one embodiment. In other words, the analytics models 120, 121, and 122 include selection criteria for choosing subsets of questions to present to users through the user interface 115 to personalize the tax return preparation process to individual users.

The analytics module 113 is integrated into the tax return preparation system 111 to filter, sort, and/or prioritize questions for presentation to the user, according to one embodiment. In an alternative embodiment, the analytics module 113 is centralized within the service provider computing environment 110, so that the analytics module 113 may provide analytics services and/or predictive modeling services to multiple applications for the service provider, according to one embodiment. For example, the analytics module 113 can be configured to provide analytics services and/or predictive modeling services to the tax return preparation system 111, to a second service provider application 131, and to a third service provider application 132, according to one embodiment. Examples of the second service provider application 131 and the third service provider application 132 include authentication, agent routing, personal financial management, payroll management, advertisement, marketing, CPA recommendations, risk analysis of users, and the like, according to various embodiments. An advantage of centralizing the analytics module 113 between multiple types of related applications is that the applications can be configured to easily share information about users, which may enable the service provider computing environment 110 to better personalize services offered to users, according one embodiment.

The tax return preparation system 111 uses information and responses from a user to personalize questions that are provided to the user, to decrease the likelihood that the user will abandon the tax return preparation process, according to one embodiment. In other words, the tax return preparation system 111 uses information or responses from the user to improve the user's experience by presenting questions that increase the user's confidence in the tax return preparation system 111, and by presenting questions that are relevant to the user (as opposed to questions that are confusing and irrelevant), to progress the user through a tax return preparation interview, according to one embodiment. The tax return preparation system 111 uses an analytics module 113 that includes two or more analytics/predictive models to filter, sort, score, and/or prioritized subsets or tiers of questions from the question pool 114 in a manner that is at least partially based on personal information and responses to questions received from the user, according to one embodiment. The analytics/predictive models are, according to one embodiment, at least partially generated based on existing tax return data 119 and/or existing user behavior data 133, which includes tax return data from one or more prior years and from users that have already filed the tax return in a previous tax year, according to one embodiment.

By providing questions during tax return preparation sessions that are personalized to a particular user, implementation of embodiments of the present disclosure allows for significant improvement to the fields of user experience, electronic tax return preparation, data collection, and data processing, according to one embodiment. As one illustrative example, by presenting questions that are based on user data and user responses to previous questions (e.g., as determined by multiple or cascaded analytics models), the tax return preparation system reduces the presentation of less-relevant and irrelevant questions such that implementation of embodiments of the present disclosure allows for progressing a user through a tax return preparation session with fewer processing cycles and less communications bandwidth. As a result, embodiments of the present disclosure allow for improved processor performance, more efficient use of memory access and data storage capabilities, reduced communication channel bandwidth utilization, and faster communications connections. Consequently, computing and communication systems implementing and/or providing the embodiments of the present disclosure are transformed into faster and more operationally efficient devices and systems.

In addition to improving overall computing performance, by using analytics models (e.g., predictive models) to select relevant questions for a user, implementation of embodiments of the present disclosure represent a significant improvement to the field of providing an efficient user experience and, in particular, efficient use of human and non-human resources. As one illustrative example, by reducing the number of irrelevant questions provided to a user of a tax return preparation system, the user can devote less time and energy to preparing his/her taxes. Additionally, by selectively presenting questions to a user that have a high likelihood of an affirmative answer (from the user), the tax return preparation system maintains, improves, and/or increases the likelihood that a potential customer will convert into a paying customer because the potential customer is receiving confirmation that the tax return preparation system appears to understand the particular user's tax situation, according to one embodiment. Consequently, using embodiments of the present disclosure, the user experience is less burdensome and time consuming and allows the user to dedicate more of his or her time to other activities or endeavors, while having confidence that the tax return preparation system is adequately addressing tax-related issues that are pertinent to the user.

Figure 2:
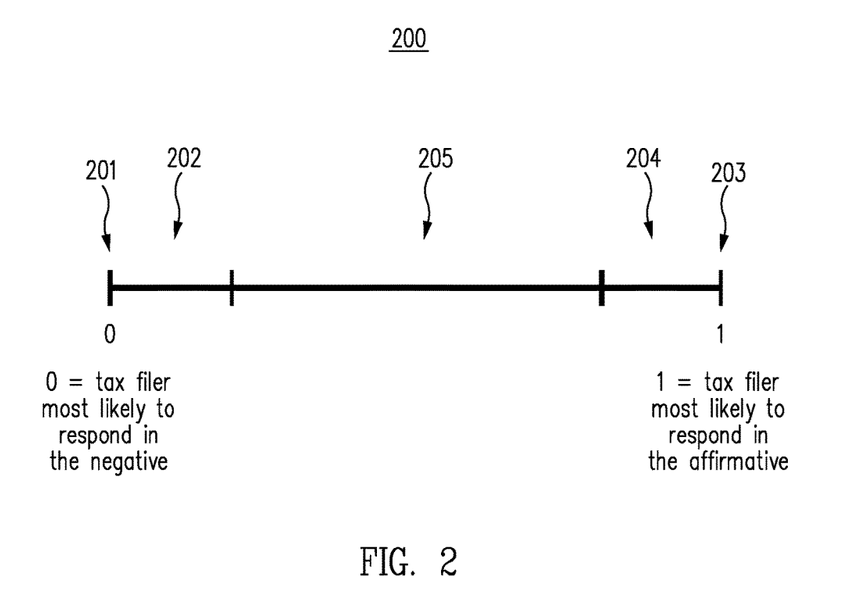
FIG. 2 is a block diagram of a scoring graph for use in a tax return preparation system, in accordance with one embodiment.

FIG. 2 illustrates a score graph 200 that represents a range of scores that the analytics models 120, 121, and/or 122 can assign to each of the questions for one or more of the tiers of questions to prioritize or weight the relevance of the questions to a user, according to one embodiment. The analytics module 113 can be configured to assign a score between 0 and 1 to each of the questions in the question pool 114, according to one embodiment. The score graph 200 includes at least five parts that may be used by the tax return preparation system 111 to determine whether or not to present a particular question to a user, according to one embodiment. The score graph 200 includes a minimum value 201 (e.g., 0), a lower range 202, a maximum value 203 (e.g., 1), an upper range 204, and a midrange 205, according to one embodiment. If a question is scored with the minimum value 201 by one or more of the analytics models within the analytics module 113, the tax return preparation engine 112 will not present the question to the user because if the user's response is clearly "no" or some other negative response, then the user may receive the impression the system is too unsophisticated to understand that the particular question clearly did not apply to the user. Thus, by withholding or omitting questions that a user is most likely to respond to in the negative, the tax return preparation system 111 maintains or improves the user's confidence in the ability of the tax return preparation system 111 to adequately handle the user's tax situation, according to one embodiment. If a question is scored in the lower range 202, the tax return preparation engine 112 does not present the question to the user for similar reasons that the tax return preparation engine 112 does not present questions that score the minimum value 201, according to one embodiment.

If a question is scored with the maximum value 203 by one or more of the analytics models within the analytics module 113, the tax return preparation engine 112 will selectively present the question to the user to assure the user that the tax return preparation system 111 is adequately configured to handle the user's tax return in spite of any unique circumstances that may apply to the user, e.g., the tax filer, according to one embodiment. The analytics module 113 strikes a balance between providing too many and too few questions having a score within maximum value 203. If the analytics module 113 does not provide enough of these questions, then the user may not have the assurance that the tax return preparation system 111 can handle the user's particular tax situation. If the analytics module 113 provides too many of these questions, the tax return preparation interview is extended in duration because these questions effectively provide very little new information to the tax return preparation system 111 for the preparation of the user's tax return. If a question is scored in the upper range 204, the tax return preparation engine 112 selectively presents the question to the user for similar reasons that the tax return preparation engine selectively presents questions that score the maximum value 203, according to one embodiment.

The tax return preparation system 111 uses questions having a score in the midrange 205 to acquire information from the user that the tax return preparation system 111 needs to complete the user's tax return and/or needs to customize/personalize the tax return preparation interview to the particular user, according to one embodiment. In information theory, entropy is the average amount of information contained in a received message. A message can be an event, a sample drawn from a data stream, or a question. The entropy in the questions that score in the midrange 205 is greater than the entropy in the questions that score the minimum value 201, in the lower range 202, the maximum value 203, or in the upper range 204 because answers to questions that score in the midrange 205 provide more clarification, insights, and information to unknown characteristics of the user. The tax return preparation system 111 uses the questions that score in the midrange 205 to personalize the tax return preparation interview and to acquire information from the user to repair the user's tax return, according to one embodiment. The tax return preparation system 111 the uses questions that score the maximum value 203, in the upper range 204, and in the midrange 205, to maintain the user's confidence and to progress the user through the tax return preparation process, according to one embodiment. In one embodiment, the midrange 205 spans from approximately 0.25 to approximately 0.75 on the score graph 200. In another embodiment, the midrange 205 spans from approximately 0.33 to approximately 0.66 on the score graph 200. In another embodiment, the midrange 205 spans from approximately 0.4 to approximately 0.6. As will be understood by those of skill in the art, other ranges for the midrange 205 are also adequate for progressing a user through the tax return process, according to other embodiments.

The tax return preparation system 111 can employ accuracy measurements after a user has been evaluated with the analytics module 113, to evaluate and improve the performance of the analytics modules, according to one embodiment. The accuracy measure may be performed using a squared error analysis. The squared error may be determined as follows:

squared error=(score for a question−truth)^2, where 0<=squared error<=1.
The score for a question is determined by one or more of the analytics models, the truth is determined by analyzing existing tax return data of users having similar characteristics to a current user, and the squared error provides a unit of measurement of accuracy for each tier of questions. By periodically identifying and evaluating the squared errors for the analytics models, the service provider can identify effective and ineffective analytics models, improve the analytics models, and/or replace any defective analytics models with more effective analytics models, according to one embodiment.

Process

Figure 3:
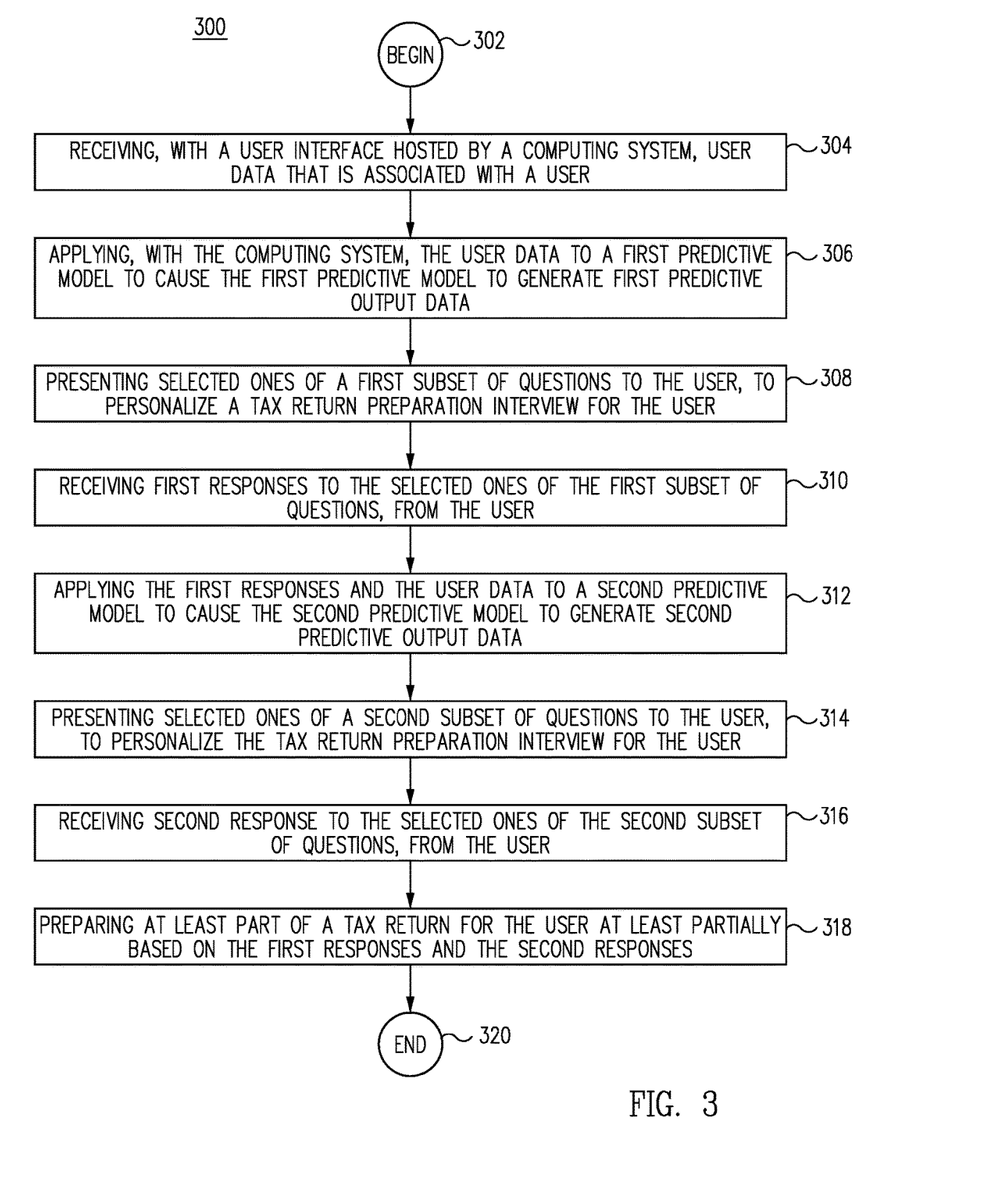
FIG. 3 is a flow diagram for improving retention of a user of a tax return preparation system, in accordance with one embodiment.

FIG. 3 illustrates a flow diagram of a process 300 for improving retention of a user of a tax return preparation system by personalizing a tax return preparation interview with questions that are at least partially based on user data processed by multiple predictive models, according to various embodiments.

At block 302, the process begins.

At block 304, the process includes receiving, with a user interface hosted by a computing system, user data that is associated with a user, according to one embodiment.

At block 306, the process includes applying, with the computing system, the user data to a first predictive model to cause the first predictive model to generate first predictive output data, according to one embodiment. The first predictive output data are first scores for a first subset of questions, and the first scores represent a relevance to the user of each of the first subset of questions, according to one embodiment.

At block 308, the process includes presenting selected ones of the first subset of questions to the user, to personalize a tax return preparation interview for the user, according to one embodiment. The selected ones of the first subset of questions have higher first scores than others of the first subset of questions, according to one embodiment.

At block 310, the process includes receiving first responses to the selected ones of the first subset of questions, from the user, according to one embodiment.

At block 312, the process includes applying the first responses and the user data to a second predictive model to cause the second predictive model to generate second predictive output data, according to one embodiment. The second predictive output data are second scores for a second subset of questions, and the second subset of questions includes the first subset of questions, according to one embodiment. The second scores represent a relevance to the user of each of the second subset of questions, according to one embodiment.

At block 314, the process includes presenting selected ones of the second subset of questions to the user, to personalize the tax return preparation interview for the user, according to one embodiment. The selected ones of the second subset of questions have higher second scores than others of the second subset of questions, according to one embodiment.

At block 316, the process includes receiving second responses to the selected ones of the second subset of questions, from the user, according to one embodiment.

At block 318, the process includes preparing at least part of a tax return for the user at least partially based on the first responses and the second responses.

At block 320, the process ends.

As noted above, the specific illustrative examples discussed above are but illustrative examples of implementations of embodiments of the method or process for improving retention of a user of a tax return preparation system. Those of skill in the art will readily recognize that other implementations and embodiments are possible. Therefore the discussion above should not be construed as a limitation on the claims provided below.

In accordance with an embodiment, a method and system improve retention of a user of a tax return preparation system by personalizing a tax return preparation interview with questions that are at least partially based on user data processed by one or more predictive models. The method and system include receiving user data that is associated with a user, and applying the user data to one or more predictive models to cause the one or more predictive models to generate predictive output data, according to one embodiment. The predictive output data are scores for a subset of questions, and the scores represent a relevance to the user of each of the subset of questions, according to one embodiment. The method and system include presenting selected ones of the subset of questions to the user, at least partially based on the scores, to personalize a tax return preparation interview for the user.

In accordance with an embodiment, a computing system implemented method improves retention of a user of a tax return preparation system by personalizing a tax return preparation interview with questions that are at least partially based on user data processed by multiple predictive models. The method includes receiving, with a user interface hosted by a computing system, user data that is associated with a user, according to one embodiment. The method includes applying, with the computing system, the user data to a first predictive model to cause the first predictive model to generate first predictive output data, according to one embodiment. The first predictive output data are first scores for a first subset of questions, and the first scores represent a relevance to the user of each of the first subset of questions, according to one embodiment. The method includes presenting selected ones of the first subset of questions to the user, to personalize a tax return preparation interview for the user, and the selected ones of the first subset of questions have higher first scores than others of the first subset of questions, according to one embodiment. The method includes receiving first responses to the selected ones of the first subset of questions, from the user, according to one embodiment. The method includes applying the first responses and the user data to a second predictive model to cause the second predictive model to generate second predictive output data, according to one embodiment. The second predictive output data are second scores for a second subset of questions, and the second subset of questions includes the first subset of questions, according to one embodiment. The second scores represent a relevance to the user of each of the second subset of questions, according to one embodiment. The method includes presenting selected ones of the second subset of questions to the user, to personalize the tax return preparation interview for the user, and the selected ones of the second subset of questions have higher second scores than others of the second subset of questions, according to one embodiment. The method includes receiving second responses to the selected ones of the second subset of questions, from the user, according to one embodiment. The method includes preparing at least part of a tax return for the user at least partially based on the first responses and the second responses, according to one embodiment.

In accordance with an embodiment, a computer-readable medium has a plurality of computer-executable instructions which, when executed by a processor, perform a method for reducing a likelihood of abandonment of a tax return preparation process by a user, by personalizing tax-related questions for a user, at least partially based on user data for the user. The instructions include a data store for storing a first subset of questions and a second subset of questions, and the first subset of questions and the second subset of questions are tax-related questions that facilitate progressing a user through a tax return preparation interview, according to one embodiment. The second subset of questions include the first subset of questions, according to one embodiment. The instructions include an analytics module that includes a first predictive model to generate first predictive model output data and a second predictive model to generate second predictive model output data, to personalize the tax return preparation interview for the user, according to one embodiment. The first predictive model output data is at least partially based on user data for the user, and the first predictive model output data includes first scores for the first subset of questions, according to one embodiment. The first scores represent relevancies between the user and the first subset of questions, according to one embodiment. The instructions include a tax return preparation engine that hosts a user interface to receive the user data from the user and to provide selected ones of the first subset of questions and selected ones of the second subset of questions to the user to progress the user through the tax return preparation interview, according to one embodiment. The tax return preparation engine hosts the user interface to receive first responses to the selected ones of the first subset of questions and to receive second responses to the selected ones of the second subset of questions, and the tax return preparation engine determines the selected ones of the first subset of questions at least partially based on the first scores, according to one embodiment. The second predictive model output data is at least partially based on the user data and first responses, according to one embodiment.

In accordance with an embodiment, a system improves retention of a user of a tax return preparation system by personalizing a tax return preparation interview with questions that are at least partially based on user data processed by multiple predictive models. The system includes at least one processor, and at least one memory coupled to the at least one processor, according to one embodiment. The at least one memory stores instructions which, when executed by any set of the one or more processors, perform a process for improving retention of a user of a tax return preparation system, according to one embodiment. The process includes receiving, with a user interface hosted by a computing system, user data that is associated with a user, according to one embodiment. The process includes applying, with the computing system, the user data to a first predictive model to cause the first predictive model to generate first predictive output data, according to one embodiment. The first predictive output data are first scores for a first subset of questions, and the first scores represent a relevance to the user of each of the first subset of questions, according to one embodiment. The process includes presenting selected ones of the first subset of questions to the user, to personalize a tax return preparation interview for the user, and the selected ones of the first subset of questions have higher first scores than others of the first subset of questions, according to one embodiment. The process includes receiving first responses to the selected ones of the first subset of questions, from the user, according to one embodiment. The process includes applying the first responses and the user data to a second predictive model to cause the second predictive model to generate second predictive output data, according to one embodiment. The second predictive output data are second scores for a second subset of questions, and the second subset of questions includes the first subset of questions, according to one embodiment. The second scores represent a relevance to the user of each of the second subset of questions, according to one embodiment. The process includes presenting selected ones of the second subset of questions to the user, to personalize the tax return preparation interview for the user, and the selected ones of the second subset of questions have higher second scores than others of the second subset of questions, according to one embodiment. The process includes receiving second responses to the selected ones of the second subset of questions, from the user, according to one embodiment. The process includes preparing at least part of a tax return for the user at least partially based on the first responses and the second responses, according to one embodiment.

By providing questions during tax return preparation sessions that are personalized to a particular user, implementation of embodiments of the present disclosure allows for significant improvement to the fields of user experience, electronic tax return preparation, data collection, and data processing, according to one embodiment. As one illustrative example, by presenting questions that are based on user data and user responses to previous questions (e.g., as determined by multiple or cascaded analytics models), the tax return preparation system reduces the presentation of less-relevant and irrelevant questions such that implementation of embodiments of the present disclosure allows for progressing a user through a tax return preparation session with fewer processing cycles and less communications bandwidth. As a result, embodiments of the present disclosure allow for improved processor performance, more efficient use of memory access and data storage capabilities, reduced communication channel bandwidth utilization, and faster communications connections. Consequently, computing and communication systems implementing and/or providing the embodiments of the present disclosure are transformed into faster and more operationally efficient devices and systems.

In addition to improving overall computing performance, by using analytics models (e.g., predictive models) to select relevant questions for a user, implementation of embodiments of the present disclosure represent a significant improvement to the field of providing an efficient user experience and, in particular, efficient use of human and non-human resources. As one illustrative example, by reducing the number of irrelevant questions provided to a user of a tax return preparation system, the user can devote less time and energy to preparing his/her taxes. Additionally, by selectively presenting questions to a user that have a high likelihood of an affirmative answer (from the user), the tax return preparation system maintains, improves, and/or increases the likelihood that a potential customer will convert into a paying customer because the potential customer is receiving confirmation that the tax return preparation system appears to understand the particular user's tax situation, according to one embodiment. Consequently, using embodiments of the present disclosure, the user experience is less burdensome and time consuming and allows the user to dedicate more of his or her time to other activities or endeavors, while having confidence that the tax return preparation system is adequately addressing tax-related issues that are pertinent to the user.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various users under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating," "accessing," "adding," "aggregating," "alerting," "applying," "analyzing," "associating," "calculating," "capturing," "categorizing," "classifying," "comparing," "creating," "defining," "detecting," "determining," "distributing," "eliminating," "encrypting," "extracting," "filtering," "forwarding," "generating," "identifying," "implementing," "informing," "monitoring," "obtaining," "posting," "processing," "providing," "receiving," "requesting," "saving," "sending," "storing," "substituting," "transferring," "transforming," "transmitting," "using," etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented method for improving retention of a user of a tax return preparation system by personalizing a tax return preparation interview with questions that are at least partially based on user data processed by one or more predictive models, comprising:

training, using one or more machine learning techniques, a predictive model using previously existing user data, the training being based on previously existing user behavior data of a user gathered or collected during one or more previous user sessions of the user with the tax return preparation system, including previous years tax return data, browsing behavior data of the user and clickstream data of the user;

selecting, using the trained predictive model, one or more potential user experience elements and creating a user interface for the user which incorporates the selected user experience elements;

receiving, with the user interface hosted by a computing system, user data that is associated with the user, the received user data including clickstream data and browsing behavior data acquired through user interaction with a user interface of the tax return preparation system;

applying, with the computing system, the user data including the clickstream data and browsing behavior data to the one or more trained predictive models to cause the one or more trained predictive models to generate predictive output data,
  wherein the predictive output data are scores for a subset of questions of a pool of questions,
  wherein the scores represent a relevance to the user of each of the subset of questions;

determining, for one or more questions of the subset of questions, respective levels of certainty of an affirmative response from the user, tagging questions of the subset of questions that have a level of certainty of an affirmative response from the user equal to or exceeding a minimum threshold level of certainty of an affirmative response from the user;

presenting selected ones of the tagged questions to the user, to personalize a tax return preparation interview for the user;

receiving from the user, responses of the tagged questions; and preparing at least part of a tax return for the user at least partially based on the responses to the selected ones of the subset of questions.

2. The method of claim 1, wherein the selected ones of the subset of questions have higher scores than non-selected ones of the subset of questions.

3. The method of claim 1, wherein the selected ones of the subset of questions have lower scores than non-selected ones of the subset of questions.

4. The method of claim 1, wherein at least part of the user data and is selected from a group of user data consisting of:
  data indicating a name;
  data indicating a Social Security Number;
  data indicating a government identification;
  data indicating a date of birth;
  data indicating an address;
  data indicating a zip code;
  data indicating a home ownership status;
  data indicating a marital status;
  data indicating an annual income;
  data indicating an employer's address;
  data indicating spousal information;
  data indicating children's information;
  data indicating assets;
  data indicating a medical history;
  data indicating an occupation;
  data indicating dependents;
  data indicating salary and wages;
  data indicating an interest income;
  data indicating dividend income;
  data indicating business income;
  data indicating contractor income;
  data indicating farm income;
  data indicating capital gains income;
  data indicating pension income;
  data indicating IRA distributions;
  data indicating unemployment compensation;
  data indicating educator expenses;
  data indicating health savings account deductions;
  data indicating moving expenses;
  data indicating IRA deductions;
  data indicating student loan interest deductions;
  data indicating tuition and fees;
  data indicating medical and dental expenses;
  data indicating state and local taxes;
  data indicating real estate taxes;
  data indicating personal property tax;
  data indicating mortgage interest;
  data indicating charitable contributions;
  data indicating casualty and theft losses;
  data indicating unreimbursed employee expenses;
  data indicating an alternative minimum tax;
  data indicating a foreign tax credit;
  data indicating education tax credits;
  data indicating retirement savings contributions;
  data indicating child tax credits;
  data indicating residential energy credits;
  data indicating website browsing preferences; and
  data indicating typical lingering duration on a website.

5. The method of claim 1, further comprising:
generating at least one of the one or more predictive models by analyzing existing user behavior data that includes at least one of:
  user clickstream data, and
  user browsing data.

6. The method of claim 1, further comprising:
generating at least one of the one or more predictive models by analyzing existing tax return data that includes tax return data from one or more prior years of tax returns.

7. The method of claim 1, further comprising:
repeatedly:
presenting additional subsets of questions based on additionally received responses; and
receiving additional responses to the additional subsets of questions.

8. The method of claim 1, wherein the scores include a range of certainty of response from the user,
  wherein at least some of the selected ones of the subset of questions are selected for being associated with a high certainty of an affirmative response from the user, to maintain or improve a confidence level of the user in an ability of a tax return preparation system to adequately prepare the tax return for the user.

9. The method of claim 1, wherein the scores include a range of certainty of response from the user,
  wherein at least some of the selected ones of the subset of questions are selected for being associated with a mid-range quantity of certainty of an affirmative response from the user, to acquire information from the user to facilitate preparing the tax return for the user.

10. The method of claim 1, wherein the scores include a range of certainty of response from the user, further comprising:
  omitting ones of the subset of questions that are associated with a low certainty of an affirmative response from the user, to maintain or improve a confidence level of the user in an ability of the tax return preparation system to adequately prepare the tax return for the user.

11. The method of claim 1, further comprising:
identifying user interface elements for presentation to the user, at least partially based on one or more of the user data and the responses.

12. The method of claim 11, wherein the user interface elements include at least one user interface element selected from a group of user interface elements consisting of:

font sizes used while presenting information to the user during the tax return preparation interview;

length of descriptions provided to the user during the tax return preparation interview;

themes presented to the user during the tax return preparation interview;

types of icons displayed to the user during the tax return preparation interview;

content of icons displayed to the user during the tax return preparation interview;

types of interface formats presented to the user during the tax return preparation interview;

images displayed to the user during the tax return preparation interview;

backgrounds presented to the user during the tax return preparation interview; and avatars presented to the user during the tax return preparation interview.

13. A nontransitory computer-readable medium having a plurality of computer-executable instructions which, when executed by a processor, perform a method for reducing a likelihood of abandonment of a tax return preparation process by a user, by personalizing tax-related questions for a user, at least partially based on user data for the user, the instructions comprising:

establishing a data store for storing subsets of questions that facilitate progressing a user through a tax return preparation interview;

establishing an analytics module that includes a trained predictive model configured to generate predictive model output data, to personalize the tax return preparation interview for the user, the training being performed using one or more machine learning techniques being applied to previously existing user data including previously existing user behavior data of a user gathered or collected during one or more previous user sessions of the user with the tax return preparation system, including previous years tax return data, browsing behavior data of the user and clickstream data of the user;

wherein the predictive model output data is at least partially based on user data for the user, wherein the predictive model output data includes scores for the one of the subsets of questions, wherein the scores represent relevancies between the user and the one of the subsets of questions, wherein the trained analytics module selects one or more potential user experience elements and creates a custom user interface for the user which incorporates the selected user experience elements; and establishing a tax return preparation engine that hosts the custom user interface to receive the user data from the user, the received user data including clickstream data and browsing behavior data of the user, and determining, for one or more questions of the subset of questions, respective levels of certainty of an affirmative response from the user, tagging questions of the subset of questions that have a level of certainty of an affirmative response from the user equal to or exceeding a minimum threshold level of certainty of an affirmative response from the user, and to provide selected ones of the one of the tagged questions, to the user to progress the user through the tax return preparation interview.

14. The computer-readable medium of claim 13, wherein at least part of the user data is selected from a group of user data consisting of:

data indicating a name;
data indicating a Social Security Number;
data indicating a government identification;
data indicating a date of birth;
data indicating an address;
data indicating a zip code;
data indicating a home ownership status;
data indicating a marital status;
data indicating an annual income;
data indicating an employer's address;
data indicating spousal information;
data indicating children's information;
data indicating assets;
data indicating a medical history;
data indicating an occupation;
data indicating dependents;
data indicating salary and wages;
data indicating an interest income;
data indicating dividend income;
data indicating business income;
data indicating contractor income;
data indicating farm income;
data indicating capital gains income;
data indicating pension income;
data indicating IRA distributions;
data indicating unemployment compensation;
data indicating educator expenses;
data indicating health savings account deductions;
data indicating moving expenses;
data indicating IRA deductions;
data indicating student loan interest deductions;
data indicating tuition and fees;
data indicating medical and dental expenses;
data indicating state and local taxes;
data indicating real estate taxes;
data indicating personal property tax;
data indicating mortgage interest;
data indicating charitable contributions;
data indicating casualty and theft losses;
data indicating unreimbursed employee expenses;
data indicating an alternative minimum tax;
data indicating a foreign tax credit;
data indicating education tax credits;
data indicating retirement savings contributions;
data indicating child tax credits;
data indicating residential energy credits;
data indicating website browsing preferences; and
data indicating typical lingering duration on a website.

* * * * *